United States Patent
Shimizu et al.

(10) Patent No.: US 9,804,313 B2
(45) Date of Patent: *Oct. 31, 2017

(54) METHODS FOR PRODUCING PHASE-DIFFERENCE FILM AND CIRCULARLY POLARIZING PLATE INVOLVING SIMULTANEOUS REDUCTION OF CLIP PITCH ON ONE SIDE AND INCREASE OF CLIP PITCH ON ANOTHER SIDE

(71) Applicant: NITTO DENKO CORPORATION, Ibaraki-shi, Osaka (JP)

(72) Inventors: Takashi Shimizu, Ibaraki (JP); Satoshi Hirata, Ibaraki (JP); Seiji Kondo, Ibaraki (JP); Nao Murakami, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 61 days.

This patent is subject to a terminal disclaimer.

(21) Appl. No.: 14/780,695

(22) PCT Filed: Mar. 12, 2014

(86) PCT No.: PCT/JP2014/056403
§ 371 (c)(1),
(2) Date: Sep. 28, 2015

(87) PCT Pub. No.: WO2014/156624
PCT Pub. Date: Oct. 2, 2014

(65) Prior Publication Data
US 2016/0062019 A1   Mar. 3, 2016

(30) Foreign Application Priority Data

Mar. 29, 2013   (JP) .................................. 2013-070788

(51) Int. Cl.
*G02B 5/30* (2006.01)
*G02B 1/04* (2006.01)
(Continued)

(52) U.S. Cl.
CPC .......... *G02B 5/3083* (2013.01); *B29C 55/045* (2013.01); *B29D 11/00644* (2013.01);
(Continued)

(58) Field of Classification Search
CPC ....... B29C 55/02; B29C 55/023; B29C 55/04; B29C 55/045; B29C 55/06; B29C 55/065;
(Continued)

(56) References Cited

U.S. PATENT DOCUMENTS

| 4,330,499 A * | 5/1982 | von und zu Aufsess ................ B29C 55/165 26/18.5 |
|---|---|---|
| 7,803,900 B2 | 9/2010 | Nakai |

(Continued)

FOREIGN PATENT DOCUMENTS

| CN | 1543396 A | 11/2004 |
|---|---|---|
| CN | 101006370 A | 7/2007 |

(Continued)

OTHER PUBLICATIONS

Extended (supplementary) European Search Report dated Oct. 5, 2016, issued in counterpart European Application No. 14773926.2. (9 pages).

(Continued)

*Primary Examiner* — Jennifer L Doak
*Assistant Examiner* — Ryan S Dunning
(74) *Attorney, Agent, or Firm* — Westerman, Hattori, Daniels & Adrian, LLP

(57) ABSTRACT

Provided is a method capable of producing a retardation film being excellent in axial accuracy, showing small changes in
(Continued)

retardation and dimensions at the time of its heating, and having a slow axis in an oblique direction with high production efficiency. The production method for a retardation film of the present invention includes: holding left and right end portions of a film with left and right variable pitch-type clips configured to have clip pitches changing in a longitudinal direction, respectively; preheating the film; causing the clip pitches of the left and right clips to each independently change to obliquely stretch the film; reducing the clip pitches of the left and right clips to shrink the film in the longitudinal direction; and releasing the film from being held with the clips.

5 Claims, 8 Drawing Sheets

(51) Int. Cl.
*B29D 11/00* (2006.01)
*B29C 55/04* (2006.01)
*B29C 55/16* (2006.01)
*B29K 69/00* (2006.01)

(52) U.S. Cl.
CPC .......... *B29D 11/00788* (2013.01); *G02B 1/04* (2013.01); *G02B 5/3033* (2013.01); *G02B 5/3041* (2013.01); *B29C 55/16* (2013.01); *B29K 2069/00* (2013.01); *B29K 2995/0032* (2013.01)

(58) Field of Classification Search
CPC ....... B29C 55/08; B29C 55/085; B29C 55/10; B29C 55/12; B29C 55/14; B29C 55/143; B29C 55/146; B29C 55/16; B29C 55/165; B29C 55/20; B29D 11/0644; B29D 11/00788; B29K 2069/00; B29K 2105/256; B65H 23/022; B65H 23/028; B65H 2301/5124; B65H 2301/51242; B65H 2301/51252; B65H 2511/172; D06C 3/021; D06C 3/04; G02B 1/04; G02B 5/3041; G02B 5/3083
USPC ..... 26/51, 52, 71, 72, 73, 93, 94; 264/235.6, 264/235.8; 349/117; 359/489.01, 489.07; 425/66, 335; 427/162, 163.1
See application file for complete search history.

(56) References Cited

U.S. PATENT DOCUMENTS

| | | | |
|---|---|---|---|
| 7,807,239 | B2 | 10/2010 | Konishi et al. |
| 8,028,383 | B2 | 10/2011 | Sano et al. |
| 8,535,588 | B2 | 9/2013 | Sano et al. |
| 8,778,486 | B2 | 7/2014 | Tanaka et al. |
| 8,952,600 | B2 | 2/2015 | Ren et al. |
| 2005/0019514 | A1 | 1/2005 | Takegawa et al. |
| 2007/0243367 | A1 | 10/2007 | Nagatake et al. |
| 2009/0036667 | A1 | 2/2009 | Hashimoto et al. |
| 2009/0116109 | A1 | 5/2009 | Konishi et al. |
| 2009/0128747 | A1* | 5/2009 | Sugiyama ............... B29C 55/06 349/96 |
| 2009/0261503 | A1 | 10/2009 | Sano et al. |
| 2009/0268292 | A1 | 10/2009 | Nakai |
| 2010/0221377 | A1 | 9/2010 | Sano et al. |
| 2012/0308796 | A1 | 12/2012 | Tanaka et al. |
| 2013/0163080 | A1 | 6/2013 | Araki et al. |
| 2013/0231455 | A1 | 9/2013 | Yasutomo |
| 2013/0249378 | A1 | 9/2013 | Murakami et al. |
| 2013/0271833 | A1 | 10/2013 | Hatano |
| 2014/0225499 | A1 | 8/2014 | Ren et al. |
| 2014/0268333 | A1 | 9/2014 | Tanaka et al. |
| 2014/0268334 | A1 | 9/2014 | Tanaka et al. |
| 2014/0285888 | A1 | 9/2014 | Tanaka et al. |
| 2015/0247963 | A1 | 9/2015 | Fujisawa et al. |
| 2016/0052215 | A1* | 2/2016 | Shimizu ................ B29C 55/045 264/1.34 |
| 2016/0052216 | A1* | 2/2016 | Shimizu ............... G02B 5/3033 156/229 |
| 2016/0096312 | A1* | 4/2016 | Shimizu .................. B29C 55/04 359/489.07 |

FOREIGN PATENT DOCUMENTS

| | | |
|---|---|---|
| CN | 101489760 A | 7/2009 |
| CN | 103052489 A | 4/2013 |
| EP | 2 502 947 A1 | 9/2012 |
| EP | 2 570 252 A2 | 3/2013 |
| EP | 2 570 252 A3 | 3/2013 |
| EP | 2 570 252 B1 | 3/2013 |
| JP | 2005-035131 A | 2/2005 |
| JP | 2005-319660 A | 11/2005 |
| JP | 2005-321543 A | 11/2005 |
| JP | 2006-348114 A | 12/2006 |
| JP | 2007-90753 A | 4/2007 |
| JP | 2007-094007 A | 4/2007 |
| JP | 2007-161994 A | 6/2007 |
| JP | 2007-261189 A | 10/2007 |
| JP | 2008-023775 A | 2/2008 |
| JP | 2008-162123 A | 7/2008 |
| JP | 2011-34069 A | 2/2011 |
| JP | 2011-034069 A | 2/2011 |
| JP | 2011-235610 A | 11/2011 |
| JP | 4845619 B2 | 12/2011 |
| JP | 2012-31332 A | 2/2012 |
| JP | 2012-67300 A | 4/2012 |
| JP | 2012-163931 A | 8/2012 |
| JP | 2012-181536 A | 9/2012 |
| JP | 2012-226996 A | 11/2012 |
| JP | 2013-54338 A | 3/2013 |
| JP | 2013-075512 A | 4/2013 |
| JP | 2013-83907 A | 5/2013 |
| JP | 2013-120208 A | 6/2013 |
| JP | 2013-186399 A | 9/2013 |
| JP | 5333699 B1 | 11/2013 |
| JP | 5333699 B1 | 11/2016 |
| KR | 10-2009-0030314 A | 3/2009 |
| TW | 200925672 A | 6/2006 |
| TW | 201234059 A1 | 8/2012 |
| WO | 03/056368 A1 | 7/2003 |
| WO | 2012/014595 A1 | 2/2012 |
| WO | 2012/017639 A1 | 2/2012 |
| WO | 2012017639 A1 | 2/2012 |
| WO | 2012/032984 A1 | 3/2012 |
| WO | 2012/070451 A1 | 5/2012 |
| WO | 2012070451 A1 | 5/2012 |
| WO | 2012/077663 A1 | 6/2012 |
| WO | 2012/091009 A1 | 7/2012 |
| WO | 2013/038807 A1 | 3/2013 |
| WO | 2013/039178 A1 | 3/2013 |
| WO | 2013/125211 A1 | 8/2013 |

OTHER PUBLICATIONS

International Search Report dated Jun. 3, 2014, issued in counterpart International Application No. PCT/JP2014/056403, with English translation. (4 pages).
Office Action dated Jan. 27, 2016, issued in counterpart Japanese Patent Application No. 2015-058491, with English translation. (9 pages).
Office Action dated Oct. 22, 2014, issued in counterpart Japanese Application No. 2013-070788, with English translation. (12 pages).
Office Action dated Jan. 15, 2015, issued in counterpart Japanese Application No. 2013-070788, with English translation. (8 pages).
Office Action dated Nov. 29, 2016, issued in counterpart Korean Patent Application No. 10-2015-7026546, with English translation. (12 pages).
Office Action dated Jan. 13, 2016, issued in Japanese Patent Application No. 2015-058554, with English translation. (11 pages).

(56) References Cited

OTHER PUBLICATIONS

Office Action dated Oct. 27, 2016, issued in Chinese Application No. 201480018492.5, with English translation. (18 pages).
English translation of International Search Report dated May 27, 2014, issued in International Application No. PCT/JP2014/056433. (1 page).
Office Action dated Dec. 27, 2016, issued in Chinese Patent Application No. 201480032264.3, with English translation. (19 pages).
Japanese Office Action dated Jan. 21, 2015 issued in Japanese patent application No. 2013-121537, with English translation. (9 pages).
Taiwanese Office Action dated Aug. 26, 2015 issued in Taiwanese patent application No. 103111892, with English translation. (9 pages).
Japanese Office Action dated Oct. 22, 2014, issued in Japanese patent application No. 2013-070789, with English translation. (11 pages).
Non-Final Office Action dated Feb. 28, 2017, issued in U.S. Appl. No. 14/892,808 (19 pages).
Non-Final Office Action dated Feb. 22, 2017, issued in U.S. Appl. No. 14/780,673 (31 pages).
Japanese Office Action dated Jan. 21, 2015, issued in Japanese patent application No. 2013-070789, with English translation. (8 pages).
Taiwanese Office Action dated Jun. 22, 2015, issued in Taiwanese patent application No. 103111890, with English translation. (9 pages).
Office Action dated Jan. 13, 2016, issued in Japanese Patent Application No. 2015-058520, with English translation. (9 pages).
Notice of Allowance dated Jun. 19, 2017, issued in U.S. Appl. No. 14/780,673 (20 pages).
Final Office Action dated Jun. 16, 2017, issued in U.S. Appl. No. 14/892,808 (21 pages).
Office Action dated Jun. 23, 2017, issued in Korean application No. 10-2015-7034396, with English translation. (2 pages).

* cited by examiner

METHODS FOR PRODUCING PHASE-DIFFERENCE FILM AND CIRCULARLY POLARIZING PLATE INVOLVING SIMULTANEOUS REDUCTION OF CLIP PITCH ON ONE SIDE AND INCREASE OF CLIP PITCH ON ANOTHER SIDE

TECHNICAL FIELD

The present invention relates to a production method for a retardation film and a production method for a circularly polarizing plate.

BACKGROUND ART

A circularly polarizing plate has been used in an image display apparatus such as a liquid crystal display apparatus (LCD) or an organic electroluminescence display apparatus (OLED) for the purposes of improving its display characteristics and preventing reflection. The circularly polarizing plate is typically obtained by laminating a polarizer and a retardation film (typically a λ/4 plate) so that the absorption axis of the polarizer and the slow axis of the retardation film may form an angle of 45°. Hitherto, the retardation film has been typically produced by performing uniaxial stretching or biaxial stretching in a longitudinal direction and/or a lateral direction, and hence its slow axis is expressed in the lateral direction (widthwise direction) or longitudinal direction (lengthwise direction) of a raw film in many cases. As a result, in order to produce the circularly polarizing plate, it has been necessary to perform the following. The retardation film is cut so as to form an angle of 45° relative to its lateral direction or longitudinal direction, and the resultant pieces are bonded to the polarizer one by one.

To solve such problem, there has been proposed a technology involving performing stretching in an oblique direction to express the slow axis of the retardation film in the oblique direction. However, any one of the technologies proposed heretofore involves a problem in that the optical characteristics and/or mechanical characteristics of a retardation film to be obtained are uneven, and the problem becomes remarkable particularly in the widthwise direction.

CITATION LIST

Patent Literature

[PTL 1] JP 4845619 B2

SUMMARY OF INVENTION

Technical Problem

The present invention has been made to solve the problems of the related art, and an object of the present invention is to provide a method capable of producing a retardation film being excellent in axial accuracy, showing small changes in retardation and dimensions at the time of its heating, and having a slow axis in an oblique direction with high production efficiency. Another object of the present invention is to provide a method capable of producing a circularly polarizing plate excellent in optical characteristics with high production efficiency.

Solution to Problem

The production method for a retardation film of the present invention includes: holding left and right end portions of a film with left and right variable pitch-type clips configured to have clip pitches changing in a longitudinal direction, respectively; preheating the film; causing the clip pitches of the left and right clips to each independently change to obliquely stretch the film; reducing the clip pitches of the left and right clips to shrink the film in the longitudinal direction; and releasing the film from being held with the clips.

In one embodiment, the production method for a retardation film further includes reducing the clip pitches of the left and right clips after the oblique stretching of the film and before the shrinkage thereof in the longitudinal direction to shrink the film in the longitudinal direction, while stretching the film in a lateral direction thereof.

In one embodiment, the oblique stretching includes increasing each of the clip pitches of the clips to a predetermined pitch under a state in which a position at which the clip pitch of the clips on one side out of the left and right clips starts to increase, and a position at which the clip pitch of the clips on another side starts to increase are set to different positions in the longitudinal direction.

In one embodiment, the oblique stretching includes (i) increasing the clip pitch of the clips on one side out of the left and right clips, and reducing the clip pitch of the clips on another side, and (ii) increasing the reduced clip pitch to the same pitch as the increased clip pitch to set the clip pitches of the clips on each side to a predetermined pitch.

In one embodiment, a shrinkage ratio in the longitudinal direction is from 0.1% to 30%.

According to another aspect of the present invention, a retardation film is provided. The retardation film is produced by the production method. The retardation film has an elongated shape and has a slow axis in a direction forming a predetermined angle relative to a lengthwise direction.

According to still another aspect of the present invention, a production method for a circularly polarizing plate is provided. The production method includes continuously bonding the retardation film and a polarizing plate having an elongated shape with lengthwise directions of the film and the plate aligned with each other while conveying the film and the plate.

Advantageous Effects of Invention

According to the embodiments of the present invention, the film is obliquely stretched and then shrunk in the longitudinal direction, whereby the retardation film being excellent in axial accuracy, showing small changes in retardation and dimensions at the time of its heating, and having a slow axis in an oblique direction can be obtained with high production efficiency. Further, according to the embodiments of the present invention, the retardation film thus obtained and the polarizing plate are laminated by the so-called roll-to-roll process, whereby the circularly polarizing plate excellent in optical characteristics can be obtained with high production efficiency.

DESCRIPTION OF EMBODIMENTS

Now, preferred embodiments of the present invention are described. However, the present invention is not limited to these embodiments.

A production method for a retardation film of the present invention includes: holding the left and right end portions of a film to be stretched with left and right variable pitch-type clips configured to have clip pitches changing in a longitudinal direction, respectively (step A: holding step); preheating the film (step B: preheating step); causing the clip pitches of the left and right clips to each independently change to obliquely stretch the film (step C: stretching step); reducing the clip pitches of the left and right clips to shrink the film in the longitudinal direction (step D: shrinking step); and releasing the film from being held with the clips (step E: releasing step). Now, the respective steps are described in detail.

A. Holding Step

Figure 1:
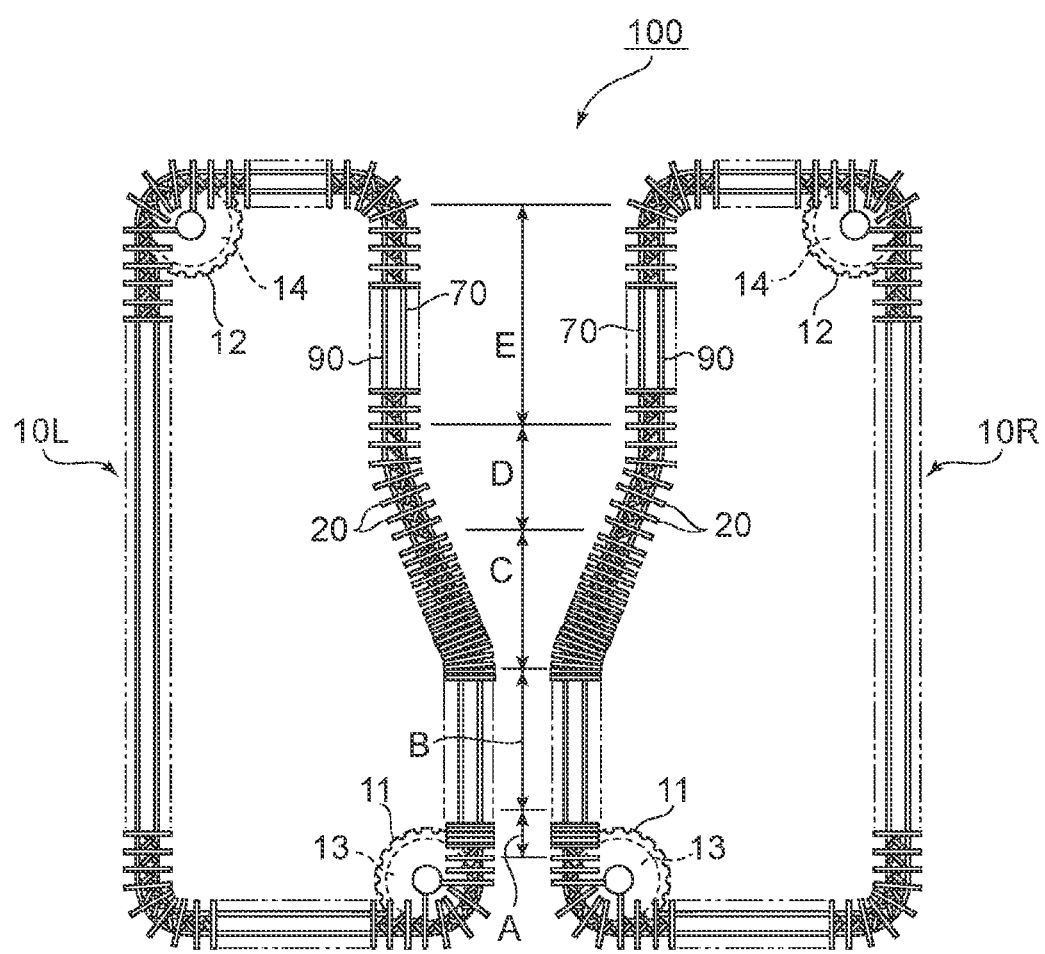
FIG. 1 is a schematic plan view for illustrating the entire construction of an example of a stretching apparatus that can be used in a production method of the present invention.
Figure 2:
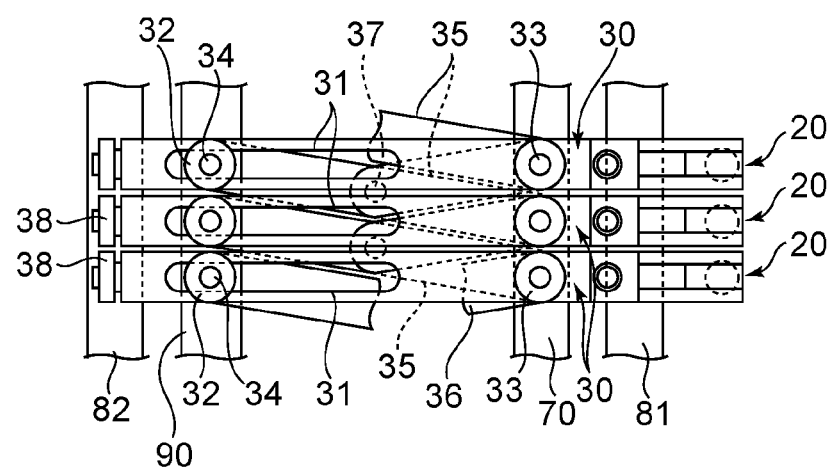
FIG. 2 is a main portion schematic plan view for illustrating a link mechanism via which a clip pitch is changed in the stretching apparatus of FIG. 1, the view being an illustration of a state in which the clip pitch is minimum.
Figure 3:
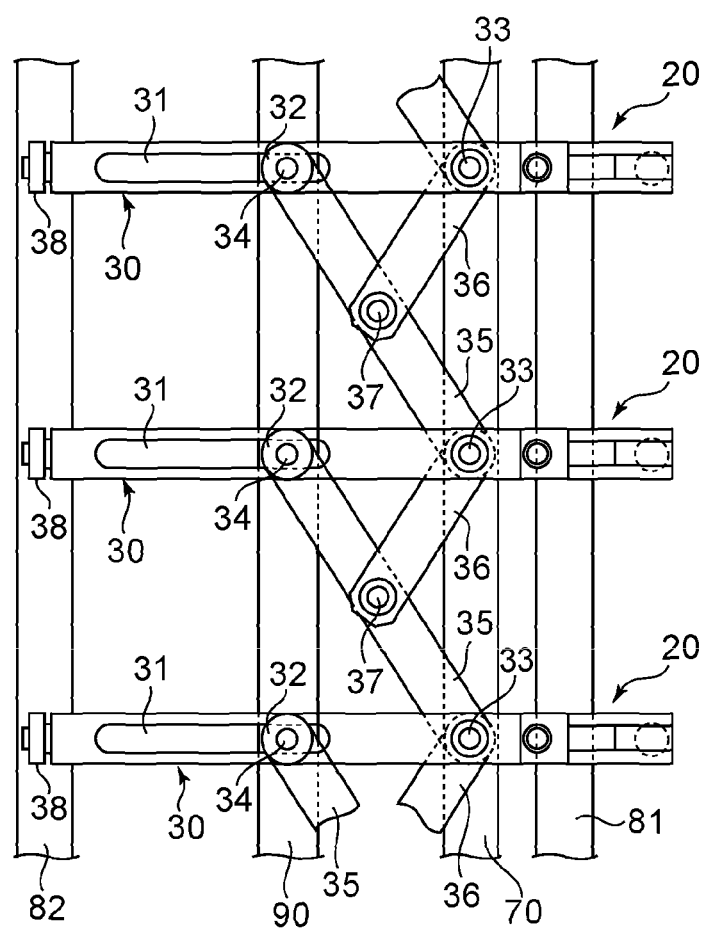
FIG. 3 is a main portion schematic plan view for illustrating the link mechanism via which the clip pitch is changed in the stretching apparatus of FIG. 1, the view being an illustration of a state in which the clip pitch is maximum.

First, a stretching apparatus that can be used in the production method of the present invention including this step is described with reference to FIG. 1 to FIG. 3. FIG. 1 is a schematic plan view for illustrating the entire construction of an example of the stretching apparatus that can be used in the production method of the present invention. FIG. 2 and FIG. 3 are each a main portion schematic plan view for illustrating a link mechanism via which a clip pitch is changed in the stretching apparatus of FIG. 1, FIG. 2 being an illustration of a state in which the clip pitch is minimum and FIG. 3 being an illustration of a state in which the clip pitch is maximum. When viewed in plan view, a stretching apparatus 100 has, on both of its left and right sides, an endless loop 10L and an endless loop 10R each having many clips 20 for holding a film so that the loops may be bilaterally symmetric with each other. It should be noted that in this description, an endless loop on a left side when viewed from a film inlet side is referred to as "left endless loop 10L" and an endless loop on a right side is referred to as "right endless loop 10R". Each of the clips 20 of the left and right endless loops 10L and 10R is guided by a reference rail 70 to cyclically move in a loop manner. The clips 20 of the left endless loop 10L cyclically move in a counterclockwise direction and the clips 20 of the right endless loop 10R cyclically move in a clockwise direction. In the stretching apparatus, a holding zone A, a preheating zone B, a stretching zone C, a shrinking zone D, and a releasing zone E are arranged in the stated order from a sheet inlet side toward a sheet outlet side. It should be noted that those zones mean zones in which the film to be stretched is substantially held, preheated, obliquely stretched, shrunk, and released, respectively, and do not mean mechanically or structurally independent sections. In addition, attention should be paid to the fact that a ratio among the lengths of the respective zones is different from the actual length ratio.

In the holding zone A and the preheating zone B, the right and left endless loops 10R and 10L are configured to be substantially parallel to each other while being separated from each other by a distance corresponding to the initial width of the film to be stretched. In the stretching zone C, the right and left endless loops 10R and 10L are configured so that the distance by which the loops are separated from each other may gradually enlarge from the preheating zone B side toward the shrinking zone D until the distance corresponds to the width of the film after its stretching. In the illustrated example, the right and left endless loops 10R and 10L in the shrinking zone D are configured to be substantially parallel to each other while being separated from each other by a distance corresponding to the width of the film after the stretching. In the shrinking zone D, the right and left endless loops 10R and 10L may be configured so that the distance by which the loops are separated each other is gradually enlarged more than or reduced less than the width of the film after the stretching (not shown).

The clips (left clips) 20 of the left endless loop 10L and the clips (right clips) 20 of the right endless loop 10R can each independently cyclically move. For example, driving sprockets 11 and 12 of the left endless loop 10L are rotationally driven in the counterclockwise direction by electric motors 13 and 14, and the driving sprockets 11 and 12 of the right endless loop 10R are rotationally driven in the clockwise direction by the electric motors 13 and 14. As a result, a running force is imparted to a clip-carrying member 30 of each of drive rollers (not shown) engaging with the driving sprockets 11 and 12. Thus, the clips 20 of the left endless loop 10L cyclically move in the counterclockwise direction and the clips 20 of the right endless loop 10R cyclically move in the clockwise direction. The clips 20 of the left endless loop 10L and the clips 20 of the right endless loop 10R can each independently be cyclically moved by each independently driving a left electric motor and a right electric motor.

Further, the clips (left clips) 20 of the left endless loop 10L and the clips (right clips) 20 of the right endless loop 10R are each of a variable pitch type. That is, the clip pitches (clip-to-clip distances) of the left and right clips 20 and 20 in the longitudinal direction (MD) can each independently change in association with their movement. The variable pitch type can be realized by any appropriate construction. Now, description is given by taking a link mechanism (pantograph mechanism) as an example.

As illustrated in FIG. 2 and FIG. 3, the elongated rectangular clip-carrying members 30 are arranged in a lateral direction in a planar view by which the clips 20 are individually carried. Although not shown, the clip-carrying members 30 are each formed so as to be of a frame structure closed by an upper beam, a lower beam, a front wall (wall on the clip side), and a rear wall (wall on a side opposite to the clip), and having a strong section. The clip-carrying members 30 are each arranged so as to roll on running road surfaces 81 and 82 by virtue of running wheels 38 on both of its ends. It should be noted that in FIG. 2 and FIG. 3, a running wheel on the front wall side (running wheel rolling on the running road surface 81) is not shown. The running road surfaces 81 and 82 are parallel to the reference rail 70 over an entire region. On the rear sides (sides opposite to the clip) of the upper beam and lower beam of each of the clip-carrying members 30, a long hole 31 is formed along the lengthwise direction of the clip-carrying member and a slider 32 engages slidably in the lengthwise direction of the long hole 31. One first axis member 33 is vertically arranged near an end portion of each of the clip-carrying members 30 on the clip 20 side so as to penetrate its upper beam and lower beam. Meanwhile, one second axis member 34 is vertically arranged so as to penetrate the slider 32 of each of the clip-carrying members 30. One end of a main link member 35 is pivotally linked to the first axis member 33 of each of the clip-carrying members 30. The other end of the main link member 35 is pivotally linked to the second axis member 34 of the adjacent clip-carrying member 30. In addition to the main link member 35, one end of a sub-link member 36 is pivotally linked to the first axis member 33 of each of the clip-carrying members 30. The other end of the sub-link member 36 is pivotally linked to the central portion of the main link member 35 by a pivot 37. By virtue of the link mechanism based on the main link member 35 and the sub-link member 36, as the extent to which the slider 32 moves toward the rear side of the clip-carrying member 30 (side opposite to the clip) becomes larger as illustrated in FIG. 2, a pitch between the clip-carrying members 30 in the longitudinal direction (hereinafter simply referred to as "clip pitch") reduces, and as the extent to which the slider 32 moves toward the front side of the clip-carrying member 30 (clip side) becomes larger as illustrated in FIG. 3, the clip pitch increases. The positioning of the slider 32 is performed by a pitch-setting rail 90. As illustrated in FIG. 2 and FIG. 3, as the clip pitch becomes larger, the distance by which the reference rail 70 and the pitch-setting rail 90 are separated from each other reduces. It should be noted that additionally detailed description of the link mechanism is omitted because the mechanism is well-known in the art.

A retardation film having a slow axis in an oblique direction (e.g., a direction at 45° relative to the longitudinal direction) can be produced by obliquely stretching the film to be stretched with such stretching apparatus as described above. First, in the holding zone A (inlet of film intake by the stretching apparatus 100), both side edges of the film to be stretched are held with the clips 20 of the right and left endless loops 10R and 10L at constant clip pitches equal to each other, and the film is fed to the preheating zone B by the movement of the right and left endless loops 10R and 10L (substantially the movement of each of the clip-carrying members 30 guided by the reference rail 70).

B. Preheating Step

In the preheating zone (preheating step) B, as described above, the right and left endless loops 10R and 10L are configured to be substantially parallel to each other while being separated from each other by a distance corresponding to the initial width of the film to be stretched, and hence the film is basically heated without being laterally stretched or longitudinally stretched. However, a distance between the left and right clips (distance in a widthwise direction) may be slightly widened in order to avoid, for example, the following inconvenience: the film sags owing to the preheating to be brought into contact with a nozzle in an oven.

In the preheating step, the film is heated to a temperature T1 (° C.). The temperature T1 is preferably equal to or more than the glass transition temperature (Tg) of the film, more preferably equal to or more than Tg+2° C., still more preferably equal to or more than Tg+5° C. Meanwhile, the heating temperature T1 is preferably equal to or less than Tg+40° C., more preferably equal to or less than Tg+30° C. The temperature T1 is, for example, from 70° C. to 190° C., preferably from 80° C. to 180° C., though the temperature varies depending on the film to be used.

A time period required for the temperature of the film to be increased to the temperature T1 and a time period for which the temperature is held at the temperature T1 can be appropriately set depending on a constituent material for the film and a production condition (e.g., the speed at which the film is conveyed). The temperature increase time period and the holding time period can be controlled by adjusting, for example, the moving speeds of the clips 20, the length of the preheating zone, and the temperature of the preheating zone.

C. Stretching Step

In the stretching zone (stretching step) C, the film is obliquely stretched by causing the clip pitches of the left and right clips 20 to each independently change. For example, the oblique stretching can be performed while the distance between the left and right clips (distance in the widthwise direction) is widened like the illustrated example. Specific description is given below. It should be noted that in the following description, the stretching zone C is described while being divided into an inlet side stretching zone (first oblique stretching zone) C1 and an outlet side stretching zone (second oblique stretching zone) C2 for convenience. The lengths of the first oblique stretching zone C1 and the second oblique stretching zone C2, and a ratio between the respective lengths can be appropriately set depending on purposes.

In one embodiment, the oblique stretching includes increasing each of the clip pitches of the clips to a predetermined pitch under a state in which a position at which the clip pitch of the clips on one side out of the left and right clips starts to increase, and a position at which the clip pitch of the clips on the other side starts to increase are set to different positions in the longitudinal direction. This embodiment is specifically described with reference to FIG. 4 and FIG. 5. First, in the preheating zone B, both left and right clip pitches are set to $P_1$. $P_1$ represents a clip pitch upon holding of the film. Next, the increase of the clip pitch of the clips on one side (right side in the illustrated example) is started simultaneously with the entry of the film into the first oblique stretching zone C1. In the first oblique stretching zone C1, the clip pitch of the right clips is increased to $P_2$. Meanwhile, the clip pitch of the left clips is maintained at $P_1$ in the first oblique stretching zone C1. Therefore, in the terminating portion of the first oblique stretching zone C1 (starting portion of the second oblique stretching zone C2), the left clips move at the clip pitch $P_1$ and the right clips move at the clip pitch $P_2$. Next, the increase of the clip pitch of the left clips is started simultaneously with the entry of the film into the second oblique stretching zone C2. In the second oblique stretching zone C2, the clip pitch of the left clips is increased to $P_2$. Meanwhile, the clip pitch of the right clips is maintained at $P_2$ in the second oblique stretching zone C2. Therefore, in the terminating portion of the second oblique stretching zone C2 (terminating portion of the stretching zone C), both the left clips and the right clips move at the clip pitch $P_2$. In the illustrated example, for simplicity, the position at which the clip pitch of the right clips starts to increase is defined as the starting portion of the first oblique stretching zone C1 and the position at which the clip pitch of the left clips starts to increase is defined as the starting portion of the second oblique stretching zone C2, but the positions can be set to any appropriate positions in the stretching zone. For example, the position at which the clip pitch of the left clips starts to increase may be defined as the intermediate portion of the first oblique stretching zone C1 or the intermediate portion of the second oblique stretching zone C2 and the position at which the clip pitch of the right clips starts to increase may be defined as the intermediate portion of the first oblique stretching zone C1. It should be noted that a ratio between the clip pitches can generally correspond to a ratio between the moving speeds of the clips. Accordingly, the ratio between the clip pitches of the left and right clips can generally correspond to a ratio between the stretching ratios of the right side edge portion and left side edge portion of the film in the MD direction.

As described above, the clip pitches can be adjusted by positioning the sliders through the adjustment of the distance by which the pitch-setting rail and reference rail of the stretching apparatus are separated from each other.

In this embodiment, a ratio $P_2/P_1$ between the clip pitch $P_1$ and the clip pitch $P_2$ (hereinafter sometimes referred to as "clip pitch change ratio") is preferably from 1.2 to 1.9, more preferably from 1.4 to 1.7. When the clip pitch change ratio falls within such range, the following advantages are obtained: the rupture of the film can be prevented and a wrinkle hardly occurs in the film.

In another embodiment, the oblique stretching includes (i) increasing the clip pitch of the clips on one side out of the left and right clips, and reducing the clip pitch of the clips on the other side, and (ii) increasing the reduced clip pitch to the same pitch as the increased clip pitch to set the clip pitches of the clips on each side to a predetermined pitch. This embodiment is specifically described with reference to FIG. 6. First, in the preheating zone B, both the left and right clip pitches are set to $P_1$. $P_1$ represents the clip pitch upon holding of the film. Next, simultaneously with the entry of the film into the first oblique stretching zone C1, the increase of the clip pitch of the clips on one side (right side in the illustrated example) is started and the reduction of the clip pitch of the clips on the other side (left side in the illustrated example) is started. In the first oblique stretching zone C1, the clip pitch of the right clips is increased to $P_2$ and the clip pitch of the left clips is reduced to $P_3$. Therefore, in the terminating portion of the first oblique stretching zone C1 (starting portion of the second oblique stretching zone C2), the left clips move at the clip pitch $P_3$ and the right clips move at the clip pitch $P_2$. Next, the increase of the clip pitch of the left clips is started simultaneously with the entry of the film into the second oblique stretching zone C2. In the second oblique stretching zone C2, the clip pitch of the left clips is increased to $P_2$. Meanwhile, the clip pitch of the right clips is maintained at $P_2$ in the second oblique stretching zone C2. Therefore, in the terminating portion of the second oblique stretching zone C2 (terminating portion of the stretching zone C), both the left clips and the right clips move at the clip pitch $P_2$. In the illustrated example, for simplicity, both the position at which the clip pitch of the left clips starts to reduce and the position at which the clip pitch of the right clips starts to increase are each defined as the starting portion of the first oblique stretching zone C1, but the positions can be set to any appropriate positions in the stretching zone as in the embodiment of FIG. 4 and FIG. 5.

In this embodiment, the clip pitch change ratio ($P_2/P_1$) is preferably from 1.2 to 1.9, more preferably from 1.4 to 1.7. When the $P_2/P_1$ falls within such range, the following advantage is obtained: the rupture of the film can be prevented. Further, a clip pitch change ratio ($P_3/P_1$) is preferably from 0.5 to 0.9, more preferably from 0.6 to 0.8. When the $P_3/P_1$ falls within such range, the following advantage is obtained: a wrinkle hardly occurs in the film.

In the oblique stretching in the production method of the present invention, the product of the clip pitch change ratio of the clips on one side and the clip pitch change ratio of the clips on the other side at the time of the completion of the first oblique stretching (stretching in the first oblique stretching zone C1) is preferably from 1.0 to 1.7. When the product of the change ratios falls within such range, a retardation film being excellent in axial accuracy, showing small retardation unevenness, and showing a small dimensional change can be obtained.

The oblique stretching can be typically performed at a temperature T2. The temperature T2 is preferably from Tg−20° C. to Tg+30° C. where Tg represents the glass transition temperature of the resin film, more preferably from Tg−10° C. to Tg+20° C., particularly preferably about Tg. The temperature T2 is, for example, from 70° C. to 180° C., preferably from 80° C. to 170° C., though the temperature varies depending on the resin film to be used. A difference (T1−T2) between the temperature T1 and the temperature T2 is preferably ±2° C. or more, more preferably ±5° C. or more. In one embodiment, a relationship of T1>T2 is satisfied and hence the film heated to the temperature T1 in the preheating step can be cooled to the temperature T2.

The oblique stretching may include stretching in a lateral direction or may not include the stretching in the lateral direction. In other words, the width of the film after the oblique stretching may be larger than the initial width of the film or may be substantially equal to the initial width. Needless to say, the illustrated example is an illustration of an embodiment including the lateral stretching. When the oblique stretching includes the lateral stretching like the illustrated example, a stretching ratio in the lateral direction (ratio $W_2/W_1$ between an initial width $W_1$ of the film and a width $W_2$ of the film after the oblique stretching) is preferably from 1.0 to 4.0, more preferably from 1.3 to 3.0. When the stretching ratio is excessively small, a corrugated galvanized iron-like wrinkle may occur in the retardation film to be obtained. When the stretching ratio is excessively large, the biaxiality of the retardation film to be obtained is raised, and hence in the case where the film is applied to a circularly polarizing plate or the like, its viewing angle characteristic may reduce.

D. Shrinking Step

In the shrinking zone (shrinking step) D, the film is shrunk in the longitudinal direction (MD) by reducing the clip pitches of the left and right clips (hereinafter referred to as "MD shrinkage treatment"). According to the present invention, the MD shrinkage treatment is performed after the oblique stretching, whereby a retardation film being excellent in axial accuracy, showing small retardation unevenness, showing a small dimensional change, and having a slow axis in an oblique direction can be obtained.

Specifically, as described above, in the starting portion of the shrinking zone (terminating portion of the stretching zone), both the left clips and the right clips move at the clip pitch $P_2$. In the MD shrinkage treatment, both the clip pitches of the left clips and the right clips are reduced to $P_4$. A clip pitch change ratio ($P_4/P_2$) is preferably from 0.7 to 0.999, more preferably from 0.7 to 0.995, still more preferably from 0.8 to 0.99. A shrinkage ratio in the MD shrinkage treatment is preferably from 0.1% to 30%, more preferably from 0.5% to 30%, still more preferably from 1% to 20%. When the clip pitch change ratio and the shrinkage ratio fall within such ranges, the effects of the present invention can be additionally significant.

The MD shrinkage treatment can be typically performed at a temperature T3. The temperature T3 typically satisfies a relationship of T2≥T3, and a difference (T2−T3) between the temperatures T2 and T3 is preferably from 0° C. to 50° C.

D'. Longitudinal Shrinkage-Lateral Stretching Step

In one embodiment, the production method of the present invention further includes reducing the clip pitches of the left and right clips after the stretching step (oblique stretching step) C and before the shrinking step D to shrink the film in the longitudinal direction, while stretching the film in the lateral direction. Therefore, in this embodiment, a longitudinal shrinkage-lateral stretching zone D' is arranged between the stretching zone C and shrinking zone D of the stretching apparatus. This embodiment is specifically described with reference to FIG. 7 and FIG. 8. As described above, in the terminating portion of the stretching zone, both the left clips and the right clips move at the clip pitch $P_2$. In a longitudinal shrinkage treatment in the longitudinal shrinkage-lateral stretching zone D', both the clip pitches of the left clips and the right clips are reduced to $P_4'$. A clip pitch change ratio ($P_4'/P_2$) is preferably from 0.7 to 0.995, more preferably from 0.8 to 0.99. When the clip pitch change ratio falls within such range, the following advantage is obtained: a wrinkle at the time of the shrinkage can be suppressed. It should be noted that the final clip pitch change ratio ($P_4/P_2$) and shrinkage ratio in the MD shrinkage treatment are as described in the section D irrespective of the presence or absence of the longitudinal shrinkage-lateral stretching treatment according to this embodiment. A lateral stretching ratio in the longitudinal shrinkage-lateral stretching according to this embodiment (ratio $W_2/W_3$ between the width $W_2$ of the film after the oblique stretching and a width $W_3$ of the film after the longitudinal shrinkage-lateral stretching) is preferably from 1.03 to 1.5, more preferably from 1.05 to 1.2. When the lateral stretching ratio falls within such range, the following advantage is obtained: the rupture of the film can be prevented. The longitudinal shrinkage-lateral stretching treatment can be typically performed at a temperature T3'. The temperature T3' is, for example, a temperature in the range of from the temperature T2 to the temperature T3. After the longitudinal shrinkage-lateral stretching treatment, the film is subjected to the MD shrinkage treatment. As is apparent from FIG. 8, this embodiment is illustrated as an embodiment conforming to the embodiment referring to FIG. 6, but needless to say, the embodiment may be an embodiment conforming to the embodiment referring to FIG. 5.

E. Releasing Step

Figure 4:
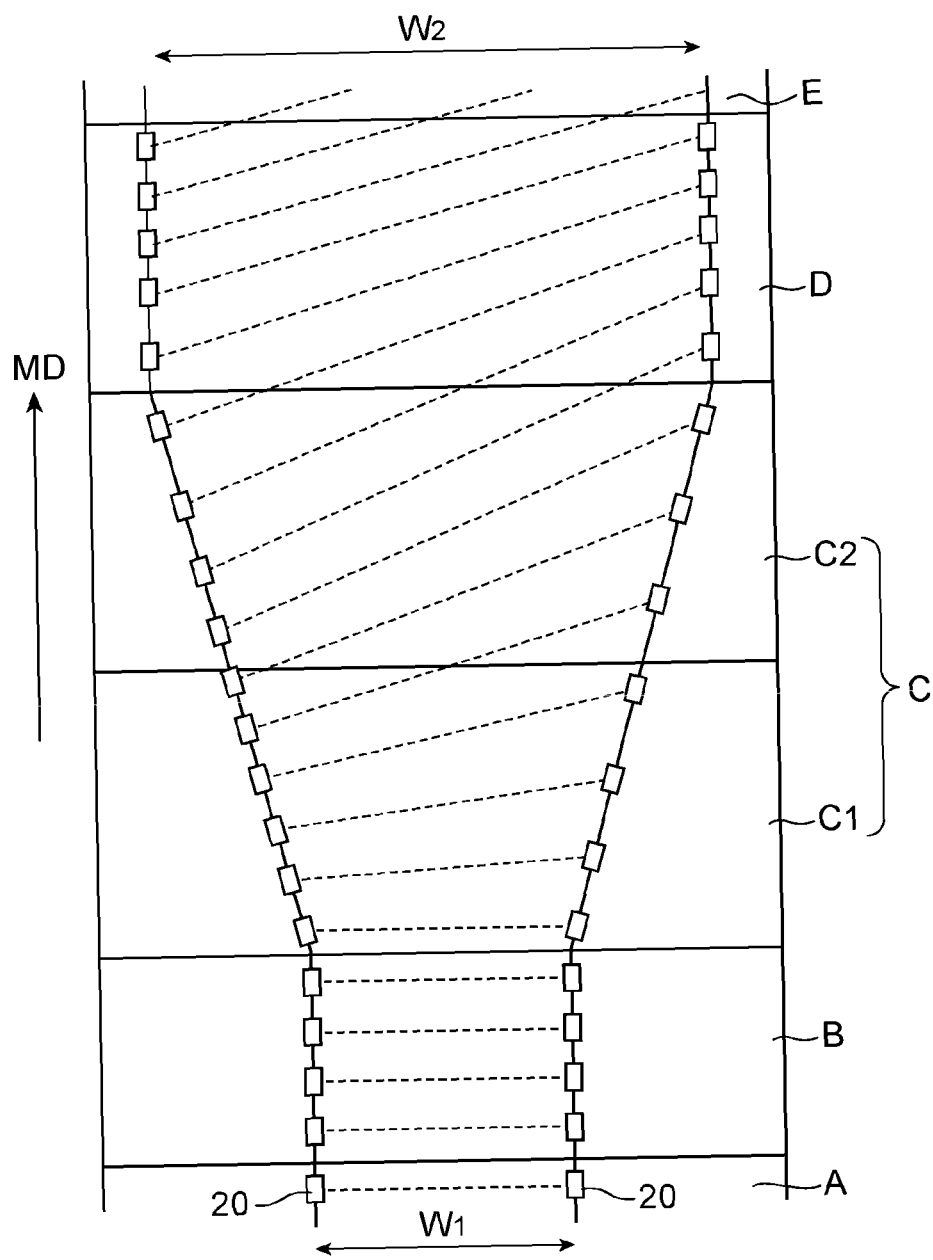
FIG. 4 is a schematic view for illustrating oblique stretching in a production method according to one embodiment of the present invention.
Figure 7:
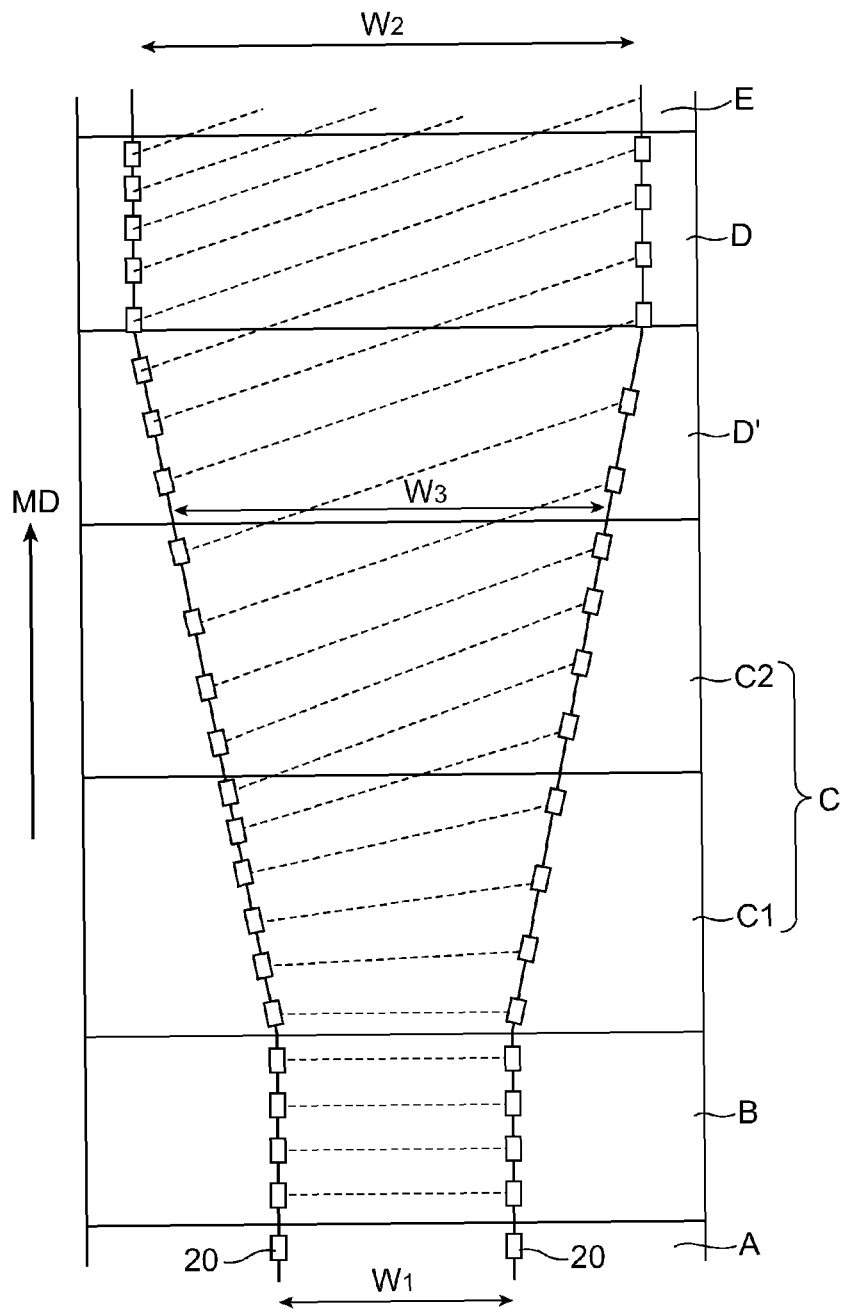
FIG. 7 is a schematic view for illustrating a production method according to another embodiment of the present invention.

Finally, the clips holding the film are released, whereby the retardation film is obtained. It should be noted that when the longitudinal shrinkage-lateral stretching treatment described in the section D' is performed, the width $W_3$ of the film after the longitudinal shrinkage-lateral stretching corresponds to the width of the retardation film to be obtained (FIG. 7). When the longitudinal shrinkage-lateral stretching treatment is not performed, the width $W_2$ of the film after the oblique stretching corresponds to the width of the retardation film to be obtained (FIG. 4). When the longitudinal shrinkage-lateral stretching treatment is not performed and the oblique stretching does not include the lateral stretching, the width of the retardation film to be obtained is substantially equal to the initial width of the film.

F. Film to be Stretched and Retardation Film Obtained by Stretching

The film to be suitably used in the production method of the present invention (substantially the stretching method described in the section A to the section E) is, for example, any appropriate film that can be used as a retardation film. As a constituent material for the film, there are given, for example, a polycarbonate resin, a polyvinyl acetal resin, a cycloolefin-based resin, an acrylic resin, a cellulose ester-based resin, a cellulose-based resin, a polyester-based resin, a polyester carbonate-based resin, an olefin-based resin, and a polyurethane-based resin. Of those, a polycarbonate resin, a polyvinyl acetal resin, a cellulose ester-based resin, a polyester-based resin, or a polyester carbonate-based resin is preferred because a retardation film showing so-called reverse wavelength dispersion dependency can be obtained with any one of these resins. Those resins may be used alone or in combination depending on desired characteristics.

Any appropriate polycarbonate-based resin is used as the polycarbonate-based resin. A preferred example thereof is a polycarbonate resin containing a structural unit derived from a dihydroxy compound. Specific examples of the dihydroxy compound include 9,9-bis(4-hydroxyphenyl)fluorene, 9,9-bis(4-hydroxy-3-methylphenyl)fluorene, 9,9-bis(4-hydroxy-3-ethylphenyl)fluorene, 9,9-bis(4-hydroxy-3-n-propylphenyl)fluorene, 9,9-bis(4-hydroxy-3-isopropylphenyl)fluorene, 9,9-bis(4-hydroxy-3-n-butylphenyl)fluorene, 9,9-bis(4-hydroxy-3-sec-butylphenyl)fluorene, 9,9-bis(4-hydroxy-3-tert-butylphenyl)fluorene, 9,9-bis(4-hydroxy-3-cyclohexylphenyl)fluorene, 9,9-bis(4-hydroxy-3-phenylphenyl)fluorene, 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, and 9,9-bis(4-(3-hydroxy-2,2-dimethylpropoxy)phenyl) fluorene. The polycarbonate resin may contain a structural unit derived from the dihydroxy compound as well as a structural unit derived from a dihydroxy compound such as isosorbide, isomannide, isoidide, spiroglycol, dioxaneglycol, diethylene glycol (DEG), triethylene glycol (TEG), polyethylene glycol (PEG), or a bisphenol.

The polycarbonate resin as described above is disclosed in, for example, JP 2012-67300 A and JP 3325560 B2 in detail. The disclosures of the patent literatures are incorporated herein by reference.

The glass transition temperature of the polycarbonate resin is preferably 110° C. or more and 250° C. or less, more preferably 120° C. or more and 230° C. or less. When the glass transition temperature is excessively low, the heat resistance of the resin tends to deteriorate and hence the resin may cause a dimensional change after its forming into a film. When the glass transition temperature is excessively high, the forming stability of the resin at the time of its forming into a film may deteriorate. In addition, the transparency of the film may be impaired. It should be noted that the glass transition temperature is determined in conformity with JIS K 7121 (1987).

Any appropriate polyvinyl acetal resin may be used as the polyvinyl acetal resin. The polyvinyl acetal resin can be typically obtained by subjecting at least two kinds of aldehyde compounds and/or ketone compounds, and a polyvinyl alcohol-based resin to a condensation reaction. Specific examples of the polyvinyl acetal resin and a detailed production method therefor are disclosed in, for example, JP 2007-161994 A. The disclosure is incorporated herein by reference.

The refractive index characteristics of the retardation film obtained by stretching the film to be stretched preferably show a relationship of nx>ny. Further, the retardation film can preferably function as a λ/4 plate. An in-plane retardation Re (550) of the retardation film is preferably from 100 nm to 180 nm, more preferably from 135 nm to 155 nm. It should be noted that in this description, nx represents a refractive index in a direction in which an in-plane refractive index becomes maximum (i.e., a slow axis direction), ny represents a refractive index in a direction perpendicular to the slow axis in a plane (i.e., a fast axis direction), and nz represents a thickness direction refractive index. In addition, $Re(\lambda)$ represents the in-plane retardation of the film measured with light having a wavelength of $\lambda$ nm at 23° C. Therefore, the Re (550) represents the in-plane retardation of the film measured with light having a wavelength of 550 nm at 23° C. The $Re(\lambda)$ is determined from the equation "$Re(\lambda)=(nx-ny)\times d$" where d represents the thickness (nm) of the film.

The retardation film shows any appropriate refractive index ellipsoid as long as the ellipsoid has a relationship of nx>ny. The refractive index ellipsoid of the retardation film preferably shows a relationship of nx>ny≥nz. The Nz coefficient of the retardation film is preferably from 1 to 2, more preferably from 1 to 1.5, still more preferably from 1 to 1.3. The Nz coefficient is determined by $Nz=Rth(\lambda)/Re(\lambda)$, where $Rth(\lambda)$ represents the thickness direction retardation of the film measured with light having a wavelength of $\lambda$ nm at 23° C. $Rth(\lambda)$ is determined from the equation "$Rth(\lambda)=(nx-nz)\times d$".

The retardation film preferably shows so-called reverse wavelength dispersion dependency. Specifically, the in-plane retardation thereof satisfies a relationship of Re(450)<Re(550)<Re(650). Re(450)/Re(550) is preferably 0.8 or more and less than 1.0, more preferably from 0.8 to 0.95. Re (550)/Re (650) is preferably 0.8 or more and less than 1.0, more preferably from 0.8 to 0.97.

The retardation film has an absolute value of its photoelastic coefficient of preferably from $2\times10^{-12}$ (m$^2$/N) to $100\times10^{-12}$ (m$^2$/N), more preferably from $10\times10^{-12}$ (m$^2$/N) to $50\times10^{-12}$ (m$^2$/N).

Figure 9:
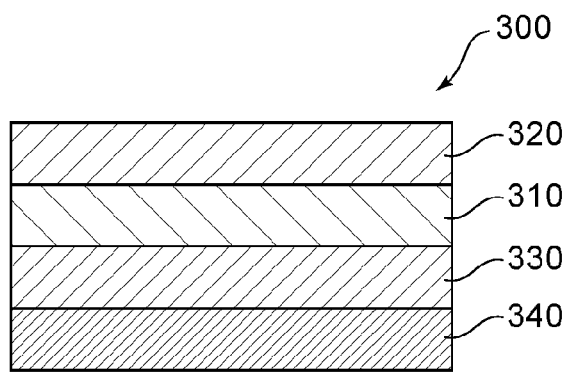
FIG. 9 is a schematic sectional view of a circularly polarizing plate using a retardation film obtained by the production method of the present invention.

G. Circularly Polarizing Plate and Production Method for Circularly Polarizing Plate Typically, the retardation film obtained by the production method of the present invention can be suitably used in a circularly polarizing plate. FIG. 9 is a schematic sectional view of an example of such circularly polarizing plate. A circularly polarizing plate 300 of the illustrated example includes a polarizer 310, a first protective film 320 arranged on one side of the polarizer 310, a second protective film 330 arranged on the other side of the polarizer 310, and a retardation film 340 arranged outside the second protective film 330. The retardation film 340 is the retardation film obtained by the production method of the present invention. The second protective film 330 may be omitted. In that case, the retardation film 340 can function as a protective film for the polarizer. An angle formed between the absorption axis of the polarizer 310 and the slow axis of the retardation film 340 is preferably from 30° to 60°, more preferably from 38° to 52°, still more preferably from 43° to 47°, particularly preferably about 45°. It should be noted that detailed description of the constructions of the polarizer and the protective film is omitted because the constructions are well known in the art.

The circularly polarizing plate may further include any appropriate optical member or optical functional layer at any appropriate position depending on purposes. For example, the outer surface of the first protective film 320 may be subjected to a surface treatment such as a hard coat treatment, an antireflection treatment, an antisticking treatment, an antiglare treatment, or a light diffusion treatment. In addition, another retardation film showing any appropriate refractive index ellipsoid may be arranged on at least one side of the retardation film 340 depending on purposes. Further, an optical member such as a front substrate (e.g., a transparent protective substrate or a touch panel) may be arranged outside the first protective film 320.

The retardation film obtained by the production method of the present invention is extremely suitable for the production of a circularly polarizing plate. Details about the foregoing are as described below. The retardation film has an elongated shape and has a slow axis in an oblique direction (as described above, a direction at, for example, 45° relative to its lengthwise direction). In many cases, a polarizer having an elongated shape has an absorption axis in its lengthwise direction or widthwise direction, and hence the use of the retardation film obtained by the production method of the present invention enables the utilization of the so-called roll-to-roll process and enables the production of a circularly polarizing plate with extremely excellent production efficiency. Moreover, the retardation film obtained by the production method of the present invention is excellent in axial accuracy, shows small retardation unevenness, and shows a small dimensional change, and hence can provide a circularly polarizing plate having extremely excellent optical characteristics. It should be noted that the roll-to-roll process refers to a method involving continuously bonding elongated films with their lengthwise directions aligned with each other while conveying the films with a roll.

Figure 10:
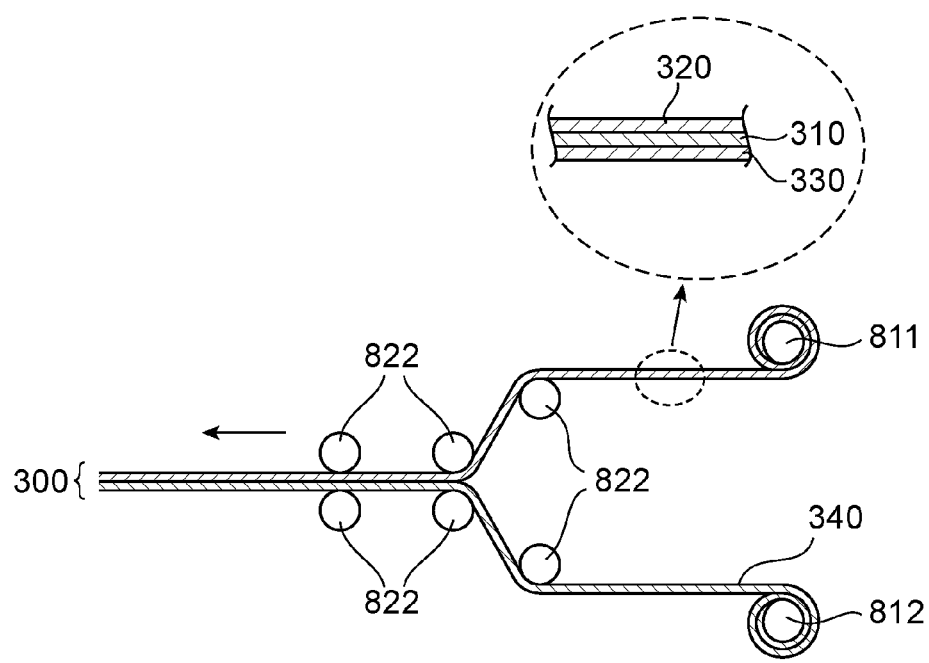
FIG. 10 is a schematic view for illustrating a production method for a circularly polarizing plate according to one embodiment of the present invention.

A production method for a circularly polarizing plate according to one embodiment of the present invention is simply described with reference to FIG. 10. In FIG. 10, reference symbols 811 and 812 represent rolls for taking up a polarizing plate and a retardation film, respectively, and reference symbol 822 represents a conveying roll. In the illustrated example, the polarizing plate (first protective film 320/polarizer 310/second protective film 330) and the retardation film 340 are fed in a direction indicated by the arrow, and are bonded under a state in which their respective lengthwise directions are aligned with each other. At that time, the bonding is performed so that the second protective film 330 of the polarizing plate and the retardation film 340 are adjacent to each other. Thus, such circularly polarizing plate 300 as illustrated in FIG. 9 can be obtained. Although not shown, a circularly polarizing plate in which the retardation film 340 functions as a protective film can also be produced by, for example, bonding the polarizing plate (first protective film 320/polarizer 310) and the retardation film 340 so that the polarizer 310 and the retardation film 340 are adjacent to each other.

EXAMPLES

Now, the present invention is specifically described byway of Examples. However, the present invention is not limited by Examples below. It should be noted that measurement and evaluation methods in Examples are as described below.

(1) Alignment Angle (Direction in which Slow Axis is Expressed)

A sample was produced by cutting the central portion of a retardation film obtained in each of Examples and Comparative Examples into a square shape measuring 50 mm wide by 50 mm long so that one side of the square was parallel to the widthwise direction of the film. An alignment angle θ of the sample at a wavelength of 550 nm and 23° C. was measured with a Mueller matrix polarimeter (manufactured by Axometrics, product name: "Axoscan"). It should be noted that the alignment angle θ was measured under a state in which the sample was placed so as to be parallel to a measuring stage.

(2) Alignment Angle Distribution (Variation in Alignment Angle)

Nine samples were collected from the retardation film (having a width of 800 mm) obtained in each of Examples and Comparative Examples in the widthwise direction of the film at an interval of 100 mm. Each sample was produced by cutting the film into a square shape measuring 50 mm wide by 50 mm long so that one side of the square was parallel to the widthwise direction of the film. An alignment angle distribution was determined by subjecting the nine samples to measurement in the same manner as in the section (1).

(3) In-Plane Retardation Re

Measurement was performed at a wavelength of 550 nm and 23° C. with a product available under the product name "Axoscan" from Axometrics in the same manner as in the section (1).

(4) Wrinkle

The state of the retardation film obtained in each of Examples and Comparative Examples was visually observed. Evaluation criteria are as described below.

○ . . . Neither a wrinkle nor waviness is observed over the entirety of the film.

Δ . . . A corrugated galvanized iron-like wrinkle is present in an end portion in the widthwise direction of the film and hence the portion waves, but the central portion of the film has no waviness.

x . . . A corrugated galvanized iron-like wrinkle is present in the film and hence the film waves.

(5) Thickness

Measurement was performed with a microgauge-type thickness meter (manufactured by Mitutoyo Corporation).

(6) Retardation Reliability

The retardation film obtained in each of Examples and Comparative Examples was cut so as to measure 26 mm by 50 mm, and was bonded to a glass plate with a pressure-sensitive adhesive. The in-plane retardation of the sample bonded to the glass at a wavelength of 550 nm and 23° C. was measured with a product available under the product name "Axoscan" from Axometrics. After that, the sample was placed in a heating oven at 85° C. for 100 hours. After that, the sample bonded to the glass was taken out from the oven and a retardation change was determined by measuring its in-plane retardation again.

(7) Dimensional Change

The retardation film obtained in each of Examples and Comparative Examples was cut so as to measure 100 mm by 100 mm, and was bonded to a glass plate with a pressure-sensitive adhesive. The dimensions of the sample bonded to the glass were accurately measured with a CNC vision measuring apparatus QuickVision (QV606) from Mitutoyo Corporation. After that, the sample was placed in a heating oven at 80° C. for 500 hours. After that, the sample bonded to the glass was taken out from the oven and a dimensional change was determined by accurately measuring its dimensions again.

Example 1

Production of Polycarbonate Resin Film

Polymerization was performed with a batch polymerization apparatus formed of two vertical reactors each including a stirring blade and a reflux condenser controlled to 100° C. 9,9-[4-(2-Hydroxyethoxy)phenyl]fluorene (BHEPF), isosorbide (ISB), diethylene glycol (DEG), diphenyl carbonate (DPC), and magnesium acetate tetrahydrate were loaded at a molar ratio "BHEPF/ISB/DEG/DPC/magnesium acetate" of 0.348/0.490/0.162/1.005/1.00×10$^{-5}$. After a first reactor had been sufficiently purged with nitrogen (oxygen concentration: 0.0005 vol % to 0.001 vol %), the inside of the reactor was warmed with a heating medium, and when a temperature in the reactor reached 100° C., stirring was started. 40 Minutes after the start of the temperature increase, the internal temperature was caused to reach 220° C. and the reactor was controlled so as to hold the temperature, and at the same time, a pressure reduction was started. 90 Minutes after the temperature had reached 220° C., a pressure in the reactor was set to 13.3 kPa. A phenol vapor produced as a by-product of the polymerization reaction was introduced into the reflux condenser at 100° C., a monomer component present in a slight amount in the phenol vapor was returned to the reactor, and a phenol vapor that did not condense was introduced into a condenser at 45° C. and recovered.

Nitrogen was introduced into the first reactor to return the pressure to the atmospheric pressure once. After that, an oligomerized reaction liquid in the first reactor was transferred to a second reactor. Next, the increase of a temperature in the second reactor and the reduction of a pressure therein were started, and the internal temperature and the pressure were set to 240° C. and 0.2 kPa, respectively in 50 minutes. After that, the polymerization was caused to proceed until predetermined stirring power was achieved. When the predetermined power was achieved, nitrogen was introduced into the reactor to return the pressure to the atmospheric pressure, and the reaction liquid was extracted in the form of a strand and pelletized with a rotary cutter. Thus, a polycarbonate resin A having a copolymerization composition "BHEPF/ISB/DEG" of 34.8/49.0/16.2 [mol %] was obtained. The polycarbonate resin had a reduced viscosity of 0.430 dL/g and a glass transition temperature of 128° C.

The resultant polycarbonate resin was dried in a vacuum at 80° C. for 5 hours, and was then formed into a polycarbonate resin film having a thickness of 195 μm with a film-producing apparatus including a uniaxial extruder (manufactured by Isuzu Kakoki, screw diameter: 25 mm, cylinder preset temperature: 220° C.), a T-die (width: 900 mm, preset temperature: 220° C.), a chill roll (preset temperature: 120° C. to 130° C.), and a take-up unit.

(Oblique Stretching)

Figure 5:
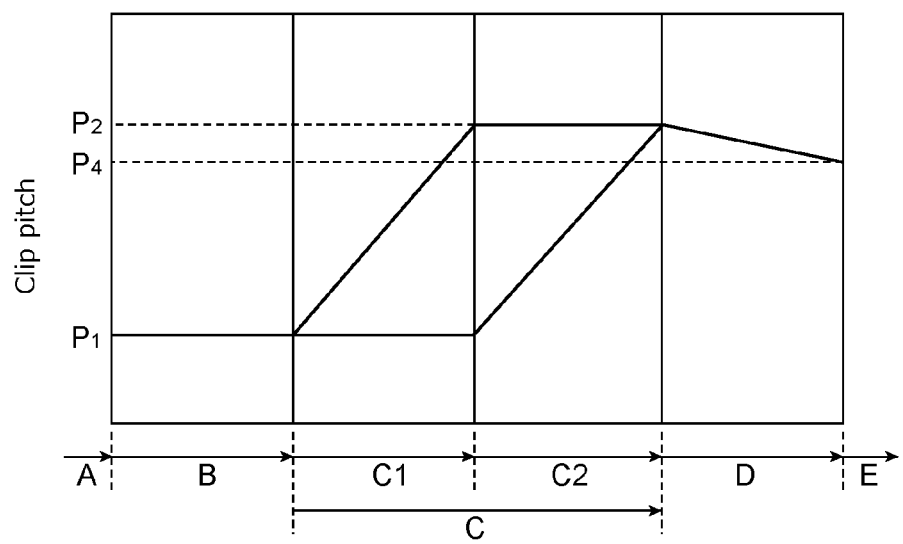
FIG. 5 is a graph for showing a relationship between each zone of the stretching apparatus and the clip pitch at the time of oblique stretching illustrated in FIG. 4.

The polycarbonate resin film obtained as described above was subjected to a preheating treatment, oblique stretching, and an MD shrinkage treatment with such apparatus as illustrated in FIG. 1 to FIG. 4 according to such clip pitch profile as illustrated in FIG. 5 to provide a retardation film. A specific procedure is as described below. The polycarbonate resin film (thickness: 195 μm, width: 765 mm) was preheated to 145° C. in the preheating zone of the stretching apparatus. In the preheating zone, the clip pitches of the left and right clips were 125 mm. Next, the increase of the clip pitch of the right clips was started simultaneously with the entry of the film into the first oblique stretching zone C1, and in the first oblique stretching zone C1, the clip pitch was increased from 125 mm to 200 mm. A clip pitch change ratio was 1.6. In the first oblique stretching zone C1, the clip pitch of the left clips was maintained at the clip pitch in the preheating zone, i.e., 125 mm. Next, the increase of the clip pitch of the left clips was started simultaneously with the entry of the film into the second oblique stretching zone C2, and in the second oblique stretching zone C2, the clip pitch was increased from 125 mm to 200 mm. Meanwhile, the clip pitch of the right clips was maintained at 200 mm in the second oblique stretching zone C2. Simultaneously with the oblique stretching, stretching was also performed in a widthwise direction at a stretching ratio of 1.9 times. It should be noted that the oblique stretching was performed at 138° C. The width of the film after the oblique stretching was 1,419 mm.

(MD Shrinkage Treatment)

Next, the MD shrinkage treatment was performed in the shrinking zone. Specifically, both the clip pitches of the left clips and the right clips were reduced from 200 mm to 187.5 mm. A shrinkage ratio in the MD shrinkage treatment was 6.2%.

Thus, the retardation film (thickness: 70 μm) was obtained. Both ends of the resultant retardation film were trimmed so that its width became 800 mm, and the film was subjected to the evaluations (1) to (7). The results are shown in Table 1.

Example 2

Figure 6:
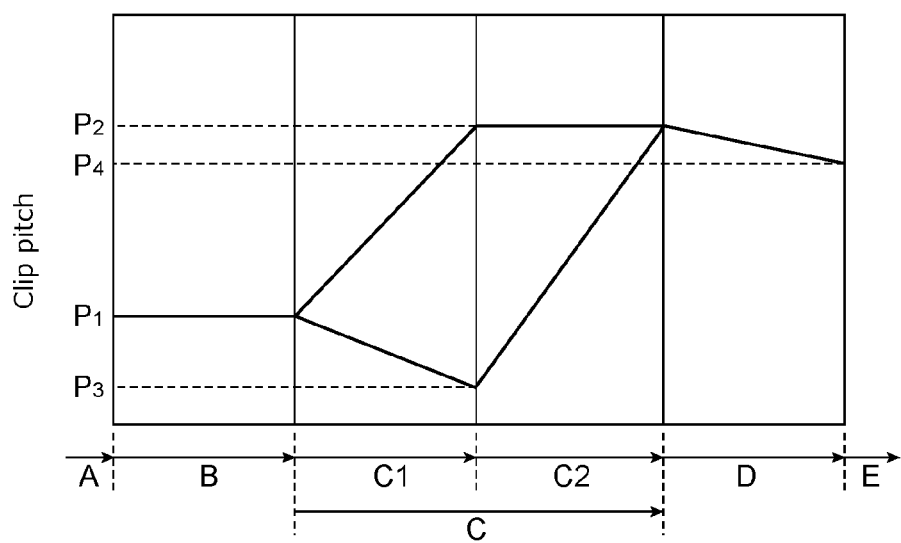
FIG. 6 is a graph for showing a relationship between each zone of the stretching apparatus and the clip pitch at the time of oblique stretching according to another embodiment.

A polycarbonate resin film (thickness: 155 µm, width: 765 mm) obtained in the same manner as in Example 1 except that its thickness was different from that of Example 1 was used and obliquely stretched according to such clip pitch profile as illustrated in FIG. 6 to provide a retardation film. Specifically, the increase of the clip pitch of the right clips was started simultaneously with the entry of the film into the first oblique stretching zone C1, and in the first oblique stretching zone C1, the clip pitch was increased from 125 mm to 177.5 mm. A clip pitch change ratio was 1.42. In the first oblique stretching zone C1, the reduction of the clip pitch of the left clips was started. In the first oblique stretching zone C1, the clip pitch was reduced from 125 mm to 90 mm. A clip pitch change ratio was 0.72. Further, the increase of the clip pitch of the left clips was started simultaneously with the entry of the film into the second oblique stretching zone C2, and in the second oblique stretching zone C2, the clip pitch was increased from 90 mm to 177.5 mm. Meanwhile, the clip pitch of the right clips was maintained at 177.5 mm in the second oblique stretching zone C2. Simultaneously with the oblique stretching, stretching was also performed in a widthwise direction at a stretching ratio of 1.9 times. Next, the MD shrinkage treatment was performed in the shrinking zone. Specifically, both the clip pitches of the left clips and the right clips were reduced from 177.5 mm to 165 mm. A shrinkage ratio in the MD shrinkage treatment was 7.0%.

Thus, the retardation film (thickness: 60 µm) was obtained. Both ends of the resultant retardation film were trimmed so that its width became 800 mm, and the film was subjected to the same evaluations as those of Example 1. The results are shown in Table 1.

Example 3

A retardation film (thickness: 63 µm) was obtained in the same manner as in Example 2 except that: a polycarbonate resin film (thickness: 165 µm, width: 765 mm) obtained in the same manner as in Example 1 except that its thickness was different from that of Example 1 was used; and longitudinal shrinkage-lateral stretching (lateral stretching ratio: 1.05 times) was performed after the oblique stretching (including the lateral stretching) and before the MD shrinkage treatment. It should be noted that a shrinkage ratio in a longitudinal direction was the sum of the shrinkage ratio of the longitudinal shrinkage of the longitudinal shrinkage-lateral stretching and the shrinkage ratio of the MD shrinkage treatment, and the shrinkage ratio was 7.0% as in Example 2. Both ends of the resultant retardation film were trimmed so that its width became 800 mm, and the film was subjected to the same evaluations as those of Example 1. The results are shown in Table 1.

Example 4

A retardation film (thickness: 75 µm) was obtained in the same manner as in Example 1 except that: a polycarbonate resin film (thickness: 200 µm, width: 765 mm) obtained in the same manner as in Example 1 except that its thickness was different from that of Example 1 was used; and the shrinkage ratio in the MD shrinkage treatment after the oblique stretching was changed to 18.7%. The resultant retardation film was subjected to the same evaluations as those of Example 1. The results are shown in Table 1.

Example 5

A retardation film (thickness: 40 µm) was obtained in the same manner as in Example 1 except that: a cycloolefin-based resin film ("ZEONOR ZF-14 Film" manufactured by Zeon Corporation, thickness: 100 µm, width: 765 mm) was used instead of the polycarbonate-based resin film; the film was preheated to 150° C. in the preheating zone; and the oblique stretching (including the lateral stretching) was performed at 150° C. Both ends of the resultant retardation film were trimmed so that its width became 800 mm, and the film was subjected to the same evaluations as those of Example 1. The results are shown in Table 1.

Example 6

Production of Polyvinyl Acetal-Based Resin Film

880 Grams of a polyvinyl alcohol-based resin [manufactured by The Nippon Synthetic Chemical Industry Co., Ltd., trade name: "NH-18" (polymerization degree=1,800, saponification degree=99.0%)] was dried at 105° C. for 2 hours, and was then dissolved in 16.72 kg of dimethyl sulfoxide (DMSO). 298 Grams of 2-methoxy-1-naphthaldehyde and 80 g of p-toluenesulfonic acid monohydrate were added to the solution, and the mixture was stirred at 40° C. for 1 hour. 318 Grams of benzaldehyde was added to the reaction solution and the mixture was stirred at 40° C. for 1 hour. After that, 457 g of dimethyl acetal was further added to the resultant and the mixture was stirred at 40° C. for 3 hours. After that, 213 g of triethylamine was added to the resultant to terminate a reaction. The resultant crude product was reprecipitated with methanol. A filtered polymer was dissolved in tetrahydrofuran, followed by reprecipitation with methanol again. The precipitate was filtered and dried to provide 1.19 kg of a white polymer.

$^1$H-NMR measurement showed that the resultant polymer had a repeating unit represented by the following formula (XI) and a ratio (molar ratio) "l:m:n:o" was 10:25:52:11. In addition, the glass transition temperature of the polymer was measured to be 130° C.

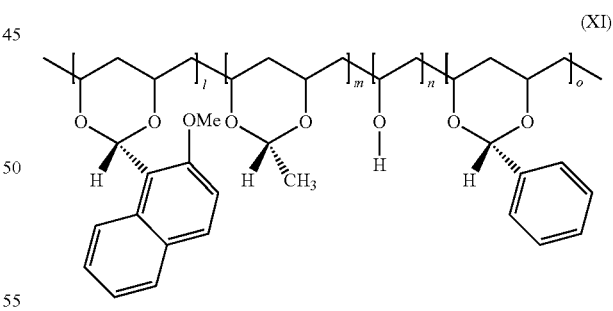

(XI)

The resultant polymer was dissolved in methyl ethyl ketone (MEK). The resultant solution was applied onto a polyethylene terephthalate film (thickness: 70 µm) with a die coater and dried with an air-circulating drying oven. After that, the dried product was peeled from the polyethylene terephthalate film to provide a film having a thickness of 225 µm and a width of 765 mm.

A retardation film (thickness: 90 µm) was obtained in the same manner as in Example 2 except that: the polyvinyl acetal-based resin film was used; the film was preheated to 145° C. in the preheating zone; and the oblique stretching (including the lateral stretching) was performed at 140° C. Both ends of the resultant retardation film were trimmed so that its width became 800 mm, and the film was subjected to the same evaluations as those of Example 1. The results are shown in Table 1.

Comparative Example 1

A retardation film (thickness: 65 µm) was obtained in the same manner as in Example 1 except that: a polycarbonate resin film (thickness: 190 µm, width: 765 mm) obtained in the same manner as in Example 1 except that its thickness was different from that of Example 1 was used; and the MD shrinkage treatment was not performed after the oblique stretching. Both ends of the resultant retardation film were trimmed so that its width became 800 mm, and the film was subjected to the same evaluations as those of Example 1. The results are shown in Table 1.

Comparative Example 2

A retardation film (thickness: 55 µm) was obtained in the same manner as in Example 2 except that: a polycarbonate resin film (thickness: 150 µm, width: 765 mm) obtained in the same manner as in Example 1 except that its thickness was different from that of Example 1 was used; and the MD shrinkage treatment was not performed after the oblique stretching. Both ends of the resultant retardation film were trimmed so that its width became 800 mm, and the film was subjected to the same evaluations as those of Example 1. The results are shown in Table 1.

REFERENCE SIGNS LIST 10L endless loop
10R endless loop
20 clip
30 clip-carrying member
70 reference rail
90 pitch-setting rail
100 stretching apparatus
300 circularly polarizing plate
310 polarizer
320 first protective film
330 second protective film
340 retardation film

The invention claimed is:

1. A production method for a retardation film, comprising:
holding left and right end portions of a film with left and right variable pitch-type clips configured to have clip pitches changing in a longitudinal direction, respectively;
preheating the film;
causing the clip pitches of the left and right clips to each independently change to obliquely stretch the film;
reducing the clip pitches of the left and right clips to shrink the film in the longitudinal direction; and
releasing the film from being held with the clips,
wherein the oblique stretching comprises
(i) increasing the clip pitch of the clips on one side out of the left and right clips, and simultaneously reducing the clip pitch of the clips on another side, and

TABLE 1

Figure 8:
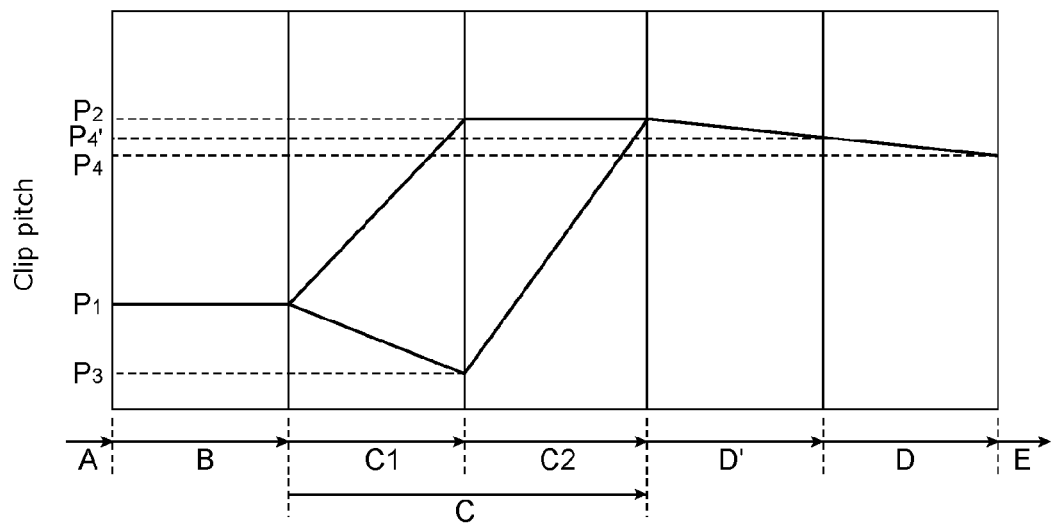
FIG. 8 is a graph for showing a relationship between each zone of the stretching apparatus and the clip pitch in the embodiment illustrated in FIG. 7.

| | Oblique stretching and MD shrinkage treatment | MD shrinkage ratio (%) | longitudinal shrinkage-Lateral stretching | Alignment angle (median) | Alignment angle (widthwise direction distribution) | Re (550) (nm) | Thickness (µm) | Wrinkle | Retardation change (%) 85° C., 100 H | Dimensional change (%) 80° C., 500 H |
|---|---|---|---|---|---|---|---|---|---|---|
| Example 1 | FIG. 5 | 6.2 | Absent | 49° | 48°-50° | 139 | 70 | ○ | 3.6 | −0.16 |
| Example 2 | FIG. 6 | 7.0 | Absent | 45° | 44°-47° | 141 | 60 | ○ | 3.4 | −0.15 |
| Example 3 | FIG. 8 | 7.0 | Present | 42° | 42°-43° | 142 | 63 | ○ | 4.1 | −0.22 |
| Example 4 | FIG. 5 | 18.7 | Absent | 44° | 43°-44° | 139 | 75 | Δ | 3.2 | −0.11 |
| Example 5 | FIG. 6 | 6.2 | Absent | 45° | 44°-47° | 141 | 40 | ○ | 3.5 | −0.14 |
| Example 6 | FIG. 6 | 6.2 | Absent | 45° | 44°-47° | 141 | 90 | ○ | 3.7 | −0.20 |
| Comparative Example 1 | No MD shrinkage | — | Absent | 52° | 50°-55° | 143 | 65 | ○ | 6.0 | −0.43 |
| Comparative Example 2 | No MD shrinkage | — | Absent | 48° | 46°-52° | 140 | 55 | ○ | 5.8 | −0.40 |

EVALUATION

As is apparent from Table 1, the retardation film obtained by each of Examples of the present invention is much more excellent in any one of axial accuracy (variation in alignment angle), and changes in retardation and dimensions after heating than the retardation film of each of Comparative Examples is. That is, it is found that such excellent effect is obtained by performing the MD shrinkage treatment after the oblique stretching.

INDUSTRIAL APPLICABILITY

The retardation film obtained by the production method of the present invention is suitably used in a circularly polarizing plate, and as a result, is suitably used in an image display apparatus such as a liquid crystal display apparatus (LCD) or an organic electroluminescence display apparatus (OLED).

(ii) increasing the reduced clip pitch to the same pitch as the increased clip pitch to set the clip pitches of the clips on each side to a predetermined pitch.

2. The production method for a retardation film according to claim 1, further comprising reducing the clip pitches of the left and right clips after the oblique stretching of the film and before the shrinkage thereof in the longitudinal direction to shrink the film in the longitudinal direction, while stretching the film in a lateral direction thereof.

3. The production method for a retardation film according to claim 1, wherein a shrinkage ratio in the longitudinal direction is from 0.1% to 30%.

4. A production method for a circularly polarizing plate, comprising:
obtaining a retardation film having an elongated shape by the production method according to claim 1, and
continuously bonding the obtained retardation film having an elongated shape and a polarizing plate having an elongated shape with lengthwise directions of the film and the plate aligned with each other while conveying the film and the plate.

5. The production method for a retardation film according to claim 1, wherein a product of a clip pitch change ratio of the clips on one side and a clip pitch change ratio of the clips on the other side at the time that step (i) of the oblique stretching is completed is from 1.0 to 1.7.

* * * * *